United States Patent
Du et al.

(10) Patent No.: US 9,676,337 B2
(45) Date of Patent: Jun. 13, 2017

(54) AUTOMOBILE C-TYPE CHUTE SIDE-BAR PEDAL AND PRODUCTION PROCESSES OF THE SAME

(71) Applicant: Zhihui Metal Industrial Co., Ltd., Shunde Foshan, Guangdong (CN)

(72) Inventors: Xingwen Du, Guangdong (CN); Zhijian Du, Guangdong (CN)

(73) Assignee: Zhihui Metal Industrial Co., Ltd., Shunde Foshan, Guangdong (CN)

( * ) Notice: Subject to any disclaimer, the term of this patent is extended or adjusted under 35 U.S.C. 154(b) by 0 days.

(21) Appl. No.: 14/330,523

(22) Filed: Jul. 14, 2014

(65) Prior Publication Data
US 2015/0283946 A1   Oct. 8, 2015

(30) Foreign Application Priority Data
Apr. 3, 2014   (CN) .............................. 201410134377

(51) Int. Cl.
*B60R 3/00*   (2006.01)

(52) U.S. Cl.
CPC ........... *B60R 3/00* (2013.01); *Y10T 29/49963* (2015.01)

(58) Field of Classification Search
CPC   B60R 3/00; B60R 3/002; B60R 3/007; B60R 3/02; B60R 3/04; E06C 5/02
See application file for complete search history.

(56) References Cited

U.S. PATENT DOCUMENTS

| 4,257,620 A | * | 3/1981 | Okland | B60R 3/002 280/164.1 |
| 4,557,494 A | * | 12/1985 | Elwell | B60R 3/002 24/514 |
| 5,193,829 A | * | 3/1993 | Holloway | B60R 3/007 280/163 |

(Continued)

FOREIGN PATENT DOCUMENTS

| CN | 202641532 U | 1/2013 |
| CN | 202911648 U | 5/2013 |

OTHER PUBLICATIONS

Office Action issued Jul. 21, 2015 in Chinese Patent Application No. 201410134377.6.

*Primary Examiner* — Frank Vanaman
(74) *Attorney, Agent, or Firm* — Shapiro, Gabor and Rosenberger, PLLC

(57) ABSTRACT

An automobile running board includes a load-bearing member and an anti-slip member mounted on an upper surface of the load-bearing member. A cross section of the load-bearing member is a downwardly opening C-shaped channel structure which is an integrally formed curved structure, and a lower portion of each of two inner sides of the load-bearing member is provided with a slide rail formed by an upwardly opening C-shaped channel structure. A slide block located within the load-bearing member is provided with a respective recess which may slide along each slide rail. The slide block has a closed periphery as viewed in a lateral cross section of the automobile running board, and a lower end of the slide block is provided with a mounting member to be connected to a car. Two end portions of the load-bearing member are provided with a sealing structure fixed to an inner side of the load-bearing member.

16 Claims, 3 Drawing Sheets

(56) References Cited

U.S. PATENT DOCUMENTS

| | | | | |
|---|---|---|---|---|
| 5,713,589 | A * | 2/1998 | Delgado | B60R 3/00 |
| | | | | 182/190 |
| 5,871,182 | A * | 2/1999 | Johnson | F16L 3/26 |
| | | | | 248/49 |
| 6,612,595 | B1 * | 9/2003 | Storer | B60R 3/00 |
| | | | | 280/163 |
| 8,403,348 | B1 * | 3/2013 | Wang | B60R 3/002 |
| | | | | 280/163 |
| 2003/0011163 | A1 * | 1/2003 | Coomber | B60R 3/002 |
| | | | | 280/163 |
| 2007/0126201 | A1 * | 6/2007 | Crandall | B60R 3/002 |
| | | | | 280/163 |
| 2011/0220601 | A1 * | 9/2011 | Herbold | B25H 1/10 |
| | | | | 211/134 |
| 2012/0104718 | A1 * | 5/2012 | Alvarez | B60R 3/00 |
| | | | | 280/163 |
| 2014/0027996 | A1 * | 1/2014 | Chen | B60R 3/002 |
| | | | | 280/163 |

* cited by examiner

AUTOMOBILE C-TYPE CHUTE SIDE-BAR PEDAL AND PRODUCTION PROCESSES OF THE SAME

CROSS REFERENCE TO RELATED APPLICATIONS

The present application claims priority to Chinese Application No. 201410134377.6 filed Apr. 3, 2014 and entitled "Automobile C-Type Chute Side-Bar Pedal and Production Processes of the Same", the disclosure of which is incorporated herein by reference in its entirety.

FIELD OF THE INVENTION

The present invention relates to automobile accessory part technologies, and more particularly to an automobile running board having a C-shaped channel member and production processes of the same.

BACKGROUND OF THE INVENTION

A running board as an automobile accessory part provides stepping assistance when people enter or exit. With the continuous development of the automobile industry, the running board as an automobile accessory part also requires continuous development of new technologies to meet the needs of the market.

Currently, the running board more commonly used in the market is a stainless steel tube type, the production processes of which are as follows:

1) forming a metal band being used as a stainless steel material of the load-bearing member into a tubular shape by a tube making machine;
2) welding a slot formed in the tubular body, and grinding a welding line;
3) performing a first time cutting of the steel tube;
4) performing a second time cutting of the steel tube;
5) manually making mounting holes and screw holes for the connecting piece;
6) welding two end sealing members onto the steel tube and grinding the welding lines;
7) inspecting quality;
8) manual polishing (polished by sand→polished by linen→polished by cloth wheel);
9) inspecting polishing quality;
10) mounting a connecting rivet nut;
11) mounting a plastic anti-slip plate; and
12) packaging a finished product.

However, such processes may have the following problems:

1) The exhaust gas and the waste water produced during the processes of profiling, welding and grinding the welding line pollute the environment seriously.

2) Since each type of running board is designed for only one vehicle model, which results in a poor versatility, various running board designs are used, which results in high costs for production management, storage and transportation, and is also prone to cause product overstocking.

3) A welding process is employed for the slot of the tube and the sealings at two ends of the stainless steel tube, and the welding portion needs to be polished smoothly before welding, thus increasing the processing and time costs.

4) Since the tubular load-bearing member is difficult to be mechanical-automatically polished and punched during the production processes, the polishing is performed manually and the holes have to be manually drilled. These processes require a worker to have a high proficiency, otherwise a poorer quality, a high defective rate, or a long processing time will happen, and a demand for additional manual inspection will increase the cost.

5) The whole production process has many steps, leading to a long production cycle and requiring many production apparatuses, resulting in a large production area.

6) It is necessary to cut the material of a larger size gradually into pieces of a smaller size because of the need to produce a variety of specifications of products, which results in a waste of material.

7) The load-bearing capacity of the tubular structure of the load-bearing member is poorer, and it is easily deformed, which leads to a production difficulty during the production process.

SUMMARY OF THE INVENTION

The present invention provides an automobile running board having a C-shaped channel member which can be adapted to a variety of different types of cars to enable the running board to) have versatility and extremely high anti-pressure ability.

The present invention also provides an automobile running board having a C-shaped channel member and the production processes of the same to reduce the costs of the running board production management, storage and transportation, avoid problems like material mixing etc., shorten the production cycle, reduce pollution and improve the product quality.

To this end, the present invention employs the following technical features:

The automobile running board includes a load-bearing member and an anti-slip member mounted onto an upper surface of the load-bearing member.

The cross section of the load-bearing member is a downwardly opening C-shaped channel structure which is an integrally formed curved structure, and a lower portion of each of two inner sides of the load-bearing member is provided with a slide rail formed by an upwardly opening C-shaped channel structure.

The automobile running board further includes a slide block located within the load-bearing member and provided with a respective recess which may slide along each slide rail, a lower end of the slide block being provided with a mounting member to be connected to a car.

Two end portions of the load-bearing member are provided with a sealing structure fixed to an inner side of the load-bearing member.

The anti-slip member, a lower surface of which fits the upper surface of the load-bearing member, is formed of a plastic material, and is provided with at least one mounting post mating with mounting holes in the load-bearing member and protruding into the interior of the load-bearing member, so as to snap-fit said anti-slip member onto said load-bearing member.

The anti-slip member has a planar surface with an anti-slip pattern, and two sides, each of which is provided with a flap whose lower surface fits closely against the upper surface of the load-bearing member and extends toward the respective sides of the load-bearing member.

The slide block is formed of a metal or plastic material, and has a hollow and integral structure, wherein a stiffener used to support upper and lower ends is disposed on a central portion thereof; an outer surface of the slide block fits an inner surface of the load-bearing member; the slide block is provided with a trough to avoid the mounting post of the anti-slip member; and the mounting member at the lower end of the slide block to be connected to a car is a rivet nut.

The anti-slip member may have two or three mounting posts in the same cross section, and the slide block has corresponding troughs.

The slide rail and the load-bearing member both are formed of stainless steel materials and) formed into an integral structure.

The sealing structure includes a connecting piece and a sealing cover. The sealing cover is fixed to the connecting piece from the inner side of the load-bearing member via a screw. The connecting piece is formed of a metal material, which fits the inner surface of the load-bearing member. The sealing cover is formed of a plastic or metal material and is provided with a boss protruding into the interior of the load-bearing member, wherein the boss fits the inner surface of the load-bearing member.

The connecting piece is provided with two mounting portions which are fixed to the outer sides of the slide rail via screws respectively.

The connecting piece is provided with two mounting portions which are fixed via screws to the inner side of the slide rail respectively, and the connecting pieces is disposed at the recess mating with the slide rail.

The production process for the automobile running board having a C-shaped channel member includes the following steps:

a) performing automated-surface grinding, polishing and filming to a stainless steel band;

b) cutting said stainless steel band with a shearing machine;

c) producing mounting holes and screw holes of said connecting piece with a punch;

d) using a bending machine to bend said stainless steel band into the final shape of said load-bearing member;

e) assembling said sliding block to said load-bearing member;

f) using a screw to fix said connecting piece to said load-bearing member;

g) using a screw to connect said sealing cover and said connecting piece from inside of said load-bearing member; and h) removing a protective film, mounting said anti-slip member and packaging the finished product.

The present invention can be adapted to a variety of different types of cars by the above structures and production processes to enable the running board to have versatility and extremely high anti-pressure capability, reduce the costs of the running board production management, storage and transportation, avoid problems like materials mixing, shorten the production cycle, alleviate pollution and improve product quality.

Figure 1:
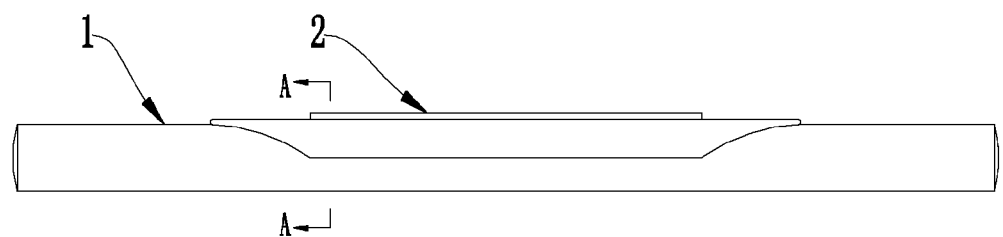
FIG. 1 is a schematic front view of the structure in accordance with an embodiment of the invention.

Reference numerals set forth in the Drawings include reference to the following elements:

1: load-bearing member
101: slide rail
2: anti-slide member
201: mounting post
202: flap
3: slide block
301: recess
302: stiffener
303: trough
304: rivet nut
4: connecting piece
401: mounting portion
5: sealing cover
501: boss

DETAILED DESCRIPTION OF EMBODIMENTS

The technical scheme of the present invention will be further described by embodiments in conjunction with the accompanying drawings.

Figure 2:
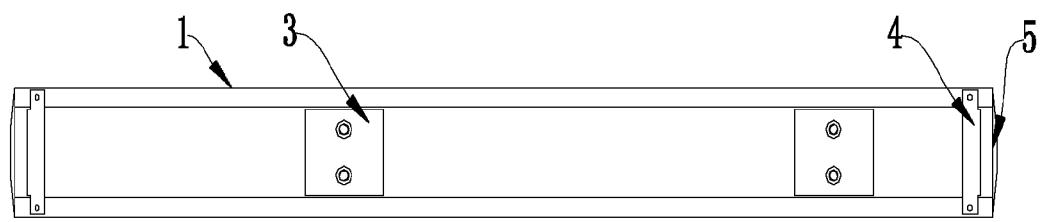
FIG. 2 is a schematic bottom view of the structure of FIG. 1.
Figure 3:
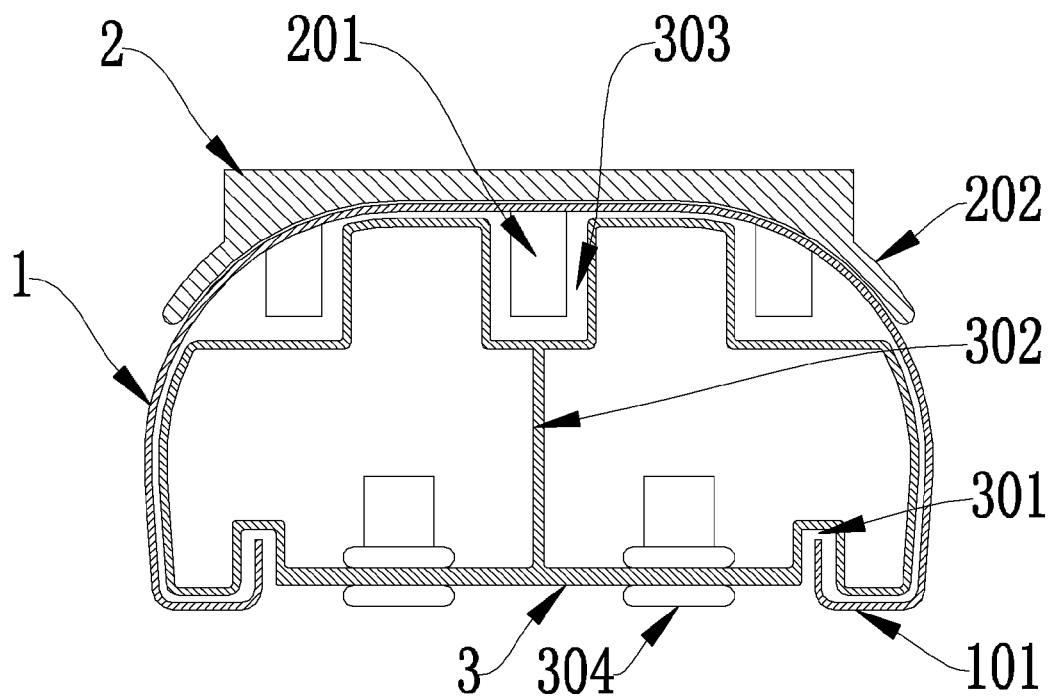
FIG. 3 is a cross-sectional schematic view along A-A of FIG. 1.

As shown in FIGS. 1-3, the automobile running board having a C-shaped channel member includes a load-bearing member 1 and an anti-slip member 2 mounted onto the upper surface of the load-bearing member 1.

As shown in FIG. 3, the cross section of the load-bearing member 1 is a downwardly opening C-shaped structure which is formed into a curved face structure integrally, and two inner sides of the load-bearing member 1 are provided with a slide rail 101 which is formed by an upwardly opening C-shaped channel structure.

As shown in FIG. 2 and FIG. 3, the automobile running board having a C-shaped channel member further includes a slide block 3 located within the load-bearing member 1 and provided with a recess 301 which may slide along the slide rail 101. A lower end of the slide block is provided with a mounting member to be connected to a car.

As shown in FIG. 2, two end portions of the load-bearing member 1 are provided with a sealing structure supported from the inner side of the load-bearing member 1.

The slide rail 101 has the following functions: 1) Two slide blocks 3 may slide in the load-bearing member 1 along the direction of the slide rail 101 by using the mating between the recess 301 and the slide rail 101, and the distance between two slide blocks 3 can be adjusted as desired such that the running board is compatible with a variety of different mounting dimensions of the structures, thus having versatility. 2) The slide rail 101 acts as a stiffener which enables the overall structure of the running board to be firmer. 3) Two sides of the load-bearing member 1 tend to open when the load-bearing member receives a downward pressure, while the slide rail 101 receives a pulling force from the slide block 3 to prevent the deformation of the load-bearing member 1, which achieves a better bearing capacity during the use of the running board. The load-bearing member 1 substantially has an upward arched structure which provides a good load-bearing capacity, so as to increase load-bearing strength. The load-bearing member 1, as formed by bending a metal steel plate integrally, decreases the need for processes of welding, coarse grinding and polishing as used in the existing steel tube forming technologies, thus shortening production cycle, and reducing process steps, and further avoiding the problems of scratching the metallic appearance of the material.)

The recess 301 is used to mate with the slide rail 101 of the load-bearing member 1 so as to enable the slide block 3 to move freely in the interior of the load-bearing member 1. When the mounting member is fixed to the car, the load-bearing member 1 and the sliding block 3 are also locked simultaneously while the sliding block 3 is fixed immovably.

As shown in FIG. 1 and FIG. 3, the anti-slip member 2, a lower surface of which fits the upper surface of the load-bearing member 1, is formed of a plastic material, and is provided with a mounting post 201 mating with mounting holes of the load-bearing member 1 and protruding into the interior of the load-bearing member 201, whereby the anti-slip member 2 is snap-fitted into the load-bearing member 1 to achieve the function of fixation.

As shown in FIG. 3, the structure of the anti-slip member 2 fitting with the load-bearing member 1 enables the structure to be more stable. The design of the mounting post 201 allows the mounting of the anti-slide member 2 to be more convenient while having—a good stability.

As shown in FIG. 3, the upper surface of the anti-slip member 2 is a planar structure with anti-slide pattern, wherein two sides of the cross section are respectively provided with a flap 202 whose lower surface fits closely against the upper surface of the load-bearing member 1 and extends towards both sides respectively.

The upper surface of the horizontal plane of the anti-slide member 2 is convenient for people standing thereon when they enter and exit, and the anti-slide pattern thereon increases friction force. In addition, the flap 202 enables the structures of the anti-slide member 2 and the load-bearing member 1 to be more compact.

As shown in FIG. 3, the slide block 3 is formed of a metal or plastic material, and has a hollow and integral structure, wherein a stiffener 302, used to support upper and lower ends, is disposed on a central portion thereof. An outer surface of the slide block 3 fits the inner surface of the load-bearing member 1. The slide block 3 is provided with a trough 303 to avoid the mounting post 201; and the mounting part at the lower end of the slide block 3 is a rivet nut 304.

The hollow structure reduces the weight of the slide block 3, and the stiffener 302 allows the slide block 3 to have sufficient bearing strength to decrease the deformation when the load-bearing member 1 is subjected to a downward force. Moreover, the stiffener 302 is able to decrease the deformation of the slide block 3 caused by an external force from the pulling force of the screw. The trough 303 is designed to avoid the anti-slip member 2, so that the slide block 3 passes by the anti-slip member 2 smoothly. The design of the slide block 3, fitting with the load-bearing member 1, is able to reduce the deformation of the load-bearing member 1 caused by a force. The structure of the sliding block 3 is the same as that of the load-bearing member 1, substantially having an upward arch curved face with a high pressure bearing property, whereby the structure maintains non-deformed under the press of a specific external force, thus maintaining the integrity of the slide block 3 and the stability of the whole product quality, so as to achieve the effect of protecting the car.)

As shown in FIG. 3, the anti-slip member 2 has two or three mounting posts 201 at the same cross section, and the corresponding slide block 3 has several troughs 303.

The slide rail 101 and the load-bearing member 1 both are formed of stainless steel materials and formed into an integral structure.

Figure 6:
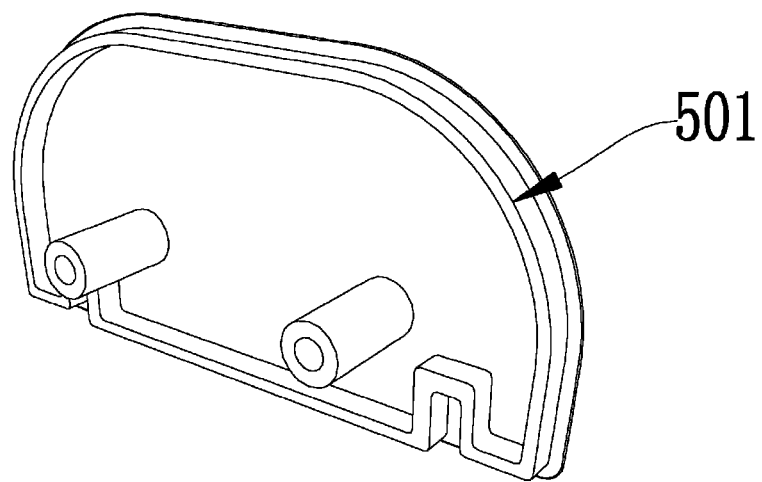
FIG. 6 is a schematic view of the structure of a sealing cover in accordance with an embodiment of the invention.

As shown in FIG. 2, the sealing structure includes a connecting piece 4 and a sealing cover 5; the sealing cover 5 is fixed with the connecting piece 4 from the inner side of the load-bearing member 1 via a screw; wherein the connecting piece 4 is formed of a metal material and fits the inner surface of the load-bearing member 1, and the sealing cover 5 is formed of a plastic or metal material. As shown in FIG. 6, the sealing cover 5 is provided with a boss 501 protruding into the interior of the load-bearing member 1, wherein the boss 501 fits the inner surface of the load-bearing member 1.

Such sealing structure reduces the welding, grinding, polishing, etc. processes of the existing welding technologies, which reduces pollution, and is easy to be assembled. The connecting piece 4 supports the load-bearing member 1 from the interior to increase the anti-pressure strength of the load-bearing member 1. The boss 501 is designed to accommodate several designs of sealing covers 5, for secure attachment and resistance to deformation.

Figure 4:
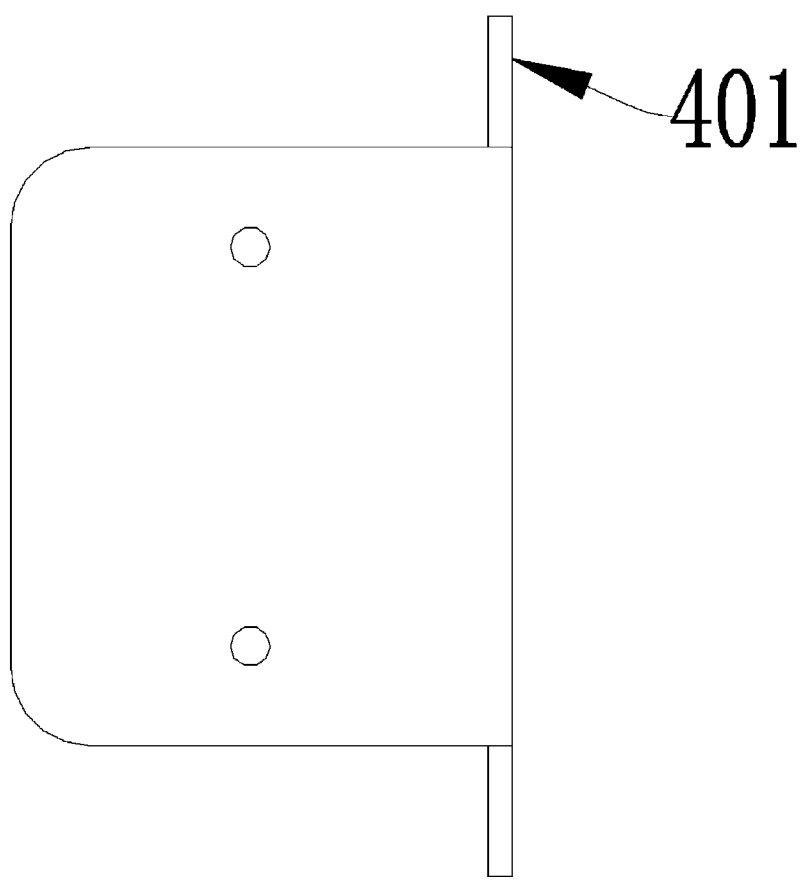
FIG. 4 is a schematic view of the structure of a connection piece in accordance with an embodiment of the invention.

As shown in the embodiment illustrated in FIG. 4, the connecting piece 4 is provided with two mounting portions 401 which are fixed respectively to the outer sides of the slide rails 101 via screws, as may be seen in FIG. 2.

Figure 5:
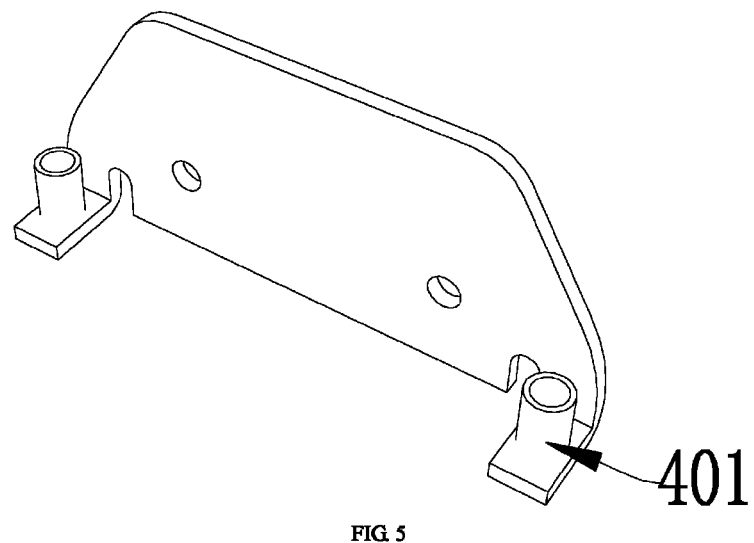
FIG. 5 is a schematic view of the structure of a connection piece in accordance with another embodiment of the invention.

As shown in the alternate embodiment illustrated in FIG. 5, the connecting piece 4 is provided with two mounting portions 401 which are fixed via screws to the inner sides of the slide rails 101 respectively, and the connecting piece 4 is disposed to mate with the slide rails 101. The mounting portions 401 are fixed to the slide rails 101 respectively so as to tense inwardly when the load-bearing member 1 is deformed under a force, which reduces the deformation of the load-bearing member 1.

The production process of the automobile running board having a C-shaped channel includes the following steps:
a) performing automated-surface grinding, polishing and filming to a stainless steel band;
b) cutting said stainless steel band with a shearing machine;
c) processing mounting holes and screw holes of said connecting piece with a punch;
d) using a bending machine to bend said stainless steel band into the final shape of said load-bearing member 1;
e) assembling said sliding block 3 to said load-bearing member 1;
f) using a screw to fix said connecting piece 4 to said load-bearing member 1;
g) using a screw to connect said sealing cover 5 and said connecting piece 4 from inside of said load-bearing member; and
h) removing a protective film, mounting said anti-slide member 2 and packaging the finished product.

The present invention has the following advantages through the above production process:
1) Since the load-bearing member is a C-shaped opening structure which has no need of the processes of tube-making and sealing, semi-automatic production can be achieved via general apparatuses such as punches and bending machines, thereby reducing the problems of high defective rate caused by the manual operation, decreasing machining processes and shortening the production cycle;
2) The bending machine can be adjusted as desired, namely, it can be used to produce the different types of products to reduce equipment costs;
3) Since the material surface is processed by grinding, polishing and filming while the material is in a state of a steel strip, the planar steel strip can be machined by a general surface processing machinery which allows the surface brightness of the products to be high and uniform in a high efficiency manner. Moreover, the filming process can protect the steel band surface from being scratched during the subsequent production processes.

4) A structure having a C-shaped opening is easy to position and can be punched with a plurality of holes simultaneously, wherein the hole sizes and the spacing between the holes are standardized; cutting sizes are unified generally to reduce management costs, and two ends of the cutting edges are smooth, which eliminates the steps of grinding and polishing after two ends being welded.

5) Because of the benefits of the centralization, simplification and mechanization of production processes, dust pollution can be effectively controlled and reduced so as to ensure a clean environment.

6) On the other hand, due to the versatility of the product, the product of the same size and model can be used with a variety of cars, thus significantly reducing the amount of product inventory, saving the waste materials produced during material cutting, reducing the costs of the production management and warehouse, and reducing the required capital by several times and reducing business risk.

The technical principle of the present invention is described with reference to specific embodiments. Therefore the description is aimed at explaining the principle of the present invention and should not be construed in any way as limiting the scope of the present invention. Based on the explanation hereinabove, those skilled in the art can conceive of other embodiments without creative work. All such embodiments are intended to be included in the scope of the present invention.

What is claimed is:

1. An automobile running board comprising a load-bearing member and an anti-slip member mounted on an upper surface of said load-bearing member, wherein:
   a cross section of said load-bearing member is a downwardly opening C-shaped channel structure which is an integrally formed curved structure, and a lower portion of each of two inner sides of said load-bearing member is provided with a slide rail formed by an upwardly opening C-shaped channel structure;
   said automobile running board further comprises a slide block located within said load-bearing member and provided with, for each said slide rail, a respective recess which may slide along said slide rail, wherein the slide block has a closed periphery surrounding a hollow interior as viewed in a lateral cross section of said automobile running board, and a lower end of the slide block is provided with a mounting member to be connected to a car;
   two end portions of said load-bearing member are provided with a sealing structure fixed to an inner side of said load-bearing member;
   said anti-slip member has a lower surface which fits said upper surface of said load-bearing member, is formed of a plastic material, and is provided with at least one mounting post mating with mounting holes in said load-bearing member and protruding into an interior of said load-bearing member, so as to snap-fit said anti-slip member onto said load-bearing member; and
   said slide block is formed of a metal or plastic material, and has an integral structure, wherein a stiffener used to support upper and lower ends of said slide block is disposed on a central portion of said slide block; an outer surface of said slide block fits an inner surface of said load-bearing member; said slide block is provided with a trough to avoid said mounting post, and the mounting member to be connected to a car at said lower end of said slide block is a rivet nut.

2. The automobile running board of claim 1, wherein said anti-slip member has a planar upper surface with an anti-slip pattern, and two sides, each of which is provided with a flap whose lower surface is closely fitted against said upper surface of said load-bearing member and extends towards a respective one of the two sides.

3. The automobile running board of claim 1, wherein said anti-slip member has two or three mounting posts at a same cross section, and said slide block has troughs corresponding to said two or three mounting posts.

4. The automobile running board of claim 1, wherein said slide rail and said load-bearing member both are formed of stainless steel materials and are formed into an integral structure.

5. The automobile running board of claim 1, wherein said sealing structure comprises a connecting piece and a sealing cover; said sealing cover is fixed to said connecting piece from an interior of said load-bearing member via a screw; said connecting piece is formed of a metal material, which fits said inner surface of said load-bearing member, and said sealing cover is formed of a plastic or metal material and is provided with a boss protruding into the interior of said load-bearing member, wherein said boss has a shape fitting said inner surface of said load-bearing member.

6. The automobile running board of claim 5, wherein said connecting piece is provided with two mounting portions, each fixed by a screw to an outer side of a corresponding one of said slide rails.

7. The automobile running board of claim 5, wherein said connecting piece is provided with two mounting portions each fixed by a screw to an inner side of a corresponding one of said slide rails, and said connecting pieces are each disposed in a corresponding one of said upwardly opening C-shaped channels.

8. An automobile running board comprising a load-bearing member and an anti-slip member mounted on an upper surface of said load-bearing member, wherein:
   a cross section of said load-bearing member is a downwardly opening C-shaped channel structure which is an integrally formed curved structure, and a lower portion of each of two inner sides of said load-bearing member is provided with a slide rail formed by an upwardly opening C-shaped channel structure;
   said automobile running board further comprises a slide block located within said load-bearing member, wherein the slide block has a tubular wall provided with a pair of recesses spaced from each other and respectively receiving and slidable along the side rails, and a lower portion of the slide block is provided with a mounting member to be connected to a car; and
   two end portions of said load-bearing member are provided with a sealing structure fixed to an inner side of said load-bearing member.

9. The automobile running board of claim 8, wherein said anti-slip member has a lower surface which fits said upper surface of said load-bearing member, is formed of a plastic material, and is provided with at least one mounting post mating with mounting holes in said load-bearing member and protruding into an interior of said load-bearing member, so as to snap-fit said anti-slip member onto said load-bearing member.

10. The automobile running board of claim 9, wherein said slide block is formed of a metal or plastic material, and has an integral structure, wherein a stiffener used to support upper and lower ends of said slide block is disposed on a central portion of said slide block; an outer surface of said slide block fits an inner surface of said load-bearing member; said slide block is provided with a trough to avoid said mounting post, and the mounting member to be connected to a car at said lower end of said slide block is a rivet nut.

11. The automobile running board of claim 10, wherein said anti-slip member has two or three mounting posts at a same cross section, and said slide block has troughs corresponding to said two or three mounting posts.

12. The automobile running board of claim 8, wherein said anti-slip member has a planar upper surface with an anti-slip pattern, and two sides, each of which is provided with a flap whose lower surface is closely fitted against said upper surface of said load-bearing member and extends towards a respective one of the two sides.

13. The automobile running board of claim 8, wherein said slide rail and said load-bearing member both are formed of stainless steel materials and are formed into an integral structure.

14. The automobile running board of claim 8, wherein said sealing structure comprises a connecting piece and a sealing cover; said sealing cover is fixed to said connecting piece from an interior of said load-bearing member via a screw; said connecting piece is formed of a metal material, which fits said inner surface of said load-bearing member, and said sealing cover is formed of a plastic or metal material and is provided with a boss protruding into the interior of said load-bearing member, wherein said boss has a shape fitting said inner surface of said load-bearing member.

15. The automobile running board of claim 14, wherein said connecting piece is provided with two mounting portions, each fixed by a screw to an outer side of a corresponding one of said slide rails.

16. The automobile running board of claim 14, wherein said connecting piece is provided with two mounting portions each fixed by a screw to an inner side of a corresponding one of said slide rails, and said connecting pieces are each disposed in a corresponding one of said upwardly opening C-shaped channels.

* * * * *